(12) United States Patent
Halemba et al.

(10) Patent No.: US 7,316,774 B2
(45) Date of Patent: Jan. 8, 2008

(54) FLUID TREATMENT SYSTEM

(75) Inventors: Peter Halemba, Russell, OH (US); George Ellis, III, East Claridon, OH (US); Stuart Park, Burton, OH (US)

(73) Assignee: Kinetico Incorporated, Newbury, OH (US)

( * ) Notice: Subject to any disclaimer, the term of this patent is extended or adjusted under 35 U.S.C. 154(b) by 245 days.

(21) Appl. No.: 10/894,213

(22) Filed: Jul. 19, 2004

(65) Prior Publication Data

US 2005/0023198 A1 Feb. 3, 2005

Related U.S. Application Data

(63) Continuation-in-part of application No. 10/009,091, filed on Jul. 22, 2002, now Pat. No. 6,764,595.

(51) Int. Cl.
*B01D 61/10* (2006.01)
*B01D 61/12* (2006.01)
*B01D 63/00* (2006.01)

(52) U.S. Cl. .................. 210/110; 210/106; 210/117; 210/135; 210/321.69

(58) Field of Classification Search ............ None
See application file for complete search history.

(56) References Cited

U.S. PATENT DOCUMENTS

| | | | |
|---|---|---|---|
| 4,579,242 A | 4/1986 | Ellis, III | |
| 4,585,554 A | 4/1986 | Burrows | |
| 4,604,194 A | 8/1986 | Entingh | |
| 4,629,568 A | 12/1986 | Ellis, III | |
| 4,650,586 A | 3/1987 | Ellis, III | |
| 4,705,625 A | 11/1987 | Hart, Jr. | |
| 4,776,952 A | 10/1988 | Burrows | |
| 4,885,085 A | 12/1989 | Beall, Jr. | |
| 4,909,934 A * | 3/1990 | Brown et al. | 210/110 |
| 4,997,553 A | 3/1991 | Clack | |
| 5,662,793 A | 9/1997 | Beall, Jr. | |
| 6,110,360 A * | 8/2000 | Hart, Jr. | 210/110 |
| 2005/0205478 A1 * | 9/2005 | Kung et al. | 210/106 |

* cited by examiner

*Primary Examiner*—Krishnan S. Menon
(74) *Attorney, Agent, or Firm*—Tarolli, Sundheim, Covell & Tummino, LLP

(57) ABSTRACT

A reverse osmosis water filtration system has a control housing that contains control components for the filtration system. The control housing may include control components for a membrane flushing system and/or feed water pressurization system for a permeate storage tank.

8 Claims, 9 Drawing Sheets

FLUID TREATMENT SYSTEM

CROSS REFERENCE TO RELATED APPLICATION

The present application is a continuation-in-part application of U.S. patent application Ser. No. 10/009,091, filed Jul. 22, 2002 now U.S. Pat. No. 6,764,595 and entitled FLUID TREATMENT SYSTEM.

FIELD OF THE INVENTION

The present invention relates generally to fluid treatment systems and, in particular, to a storage tank and storage tank control valve system for use with a fluid treatment system, such as a reverse osmosis system.

BACKGROUND ART

It is known to use a storage tank to store a processed fluid produced by a fluid treatment system. For example, reverse osmosis systems are used to produce potable or drinking water from water sources that contain undesirable contaminants, etc. In a typical reverse osmosis system, especially in the type of reverse osmosis system used in homes, the rate at which treated water or "permeate" is produced by the system can be very low. As a result, a storage tank is used to store permeate, so that relatively large quantities can be made available when the consumer opens the tap or faucet. In the past, "precharged" storage tanks are used. In this type of storage tank, a bladder is used to define a pressurized chamber, usually filled with a compressible gas, such as nitrogen. The bladder isolates the gas from the processed water received by the tank. As processed water or "permeate" (in the case of a reverse osmosis system) is it received by the tank, it gradually compresses the gas in the pressurized chamber. As a result, the permeate is stored under pressure, such that when the tank is opened, the pressure in the storage tank exerted by the compressed gas, forces permeate out of the tank and to the faucet.

Although these storage tanks are widely used and provide a suitable means for storing permeate, they do have a significant drawback. As more and more permeate is received by the tank, the pressure needed to effect flow of permeate into the tank increases because as the gas chamber is compressed, forces on the bladder increase. Accordingly, in order to completely fill the storage tank, a significant pressure must be applied to the permeate as the capacity of the tank is reached. This resistance to flow exerted by the tank in itself decreases production rate of the reverse osmosis system, since the reverse osmosis system relies on differential pressures between the source and the output to effect flow across the membrane. In addition, as permeate is discharged by the tank, its delivery pressure is gradually reduced as the pressurized gas chamber expands. As a result, the delivery pressure varies significantly between a full tank and a nearly empty tank.

The assignee of the present invention manufactures and sells a reverse osmosis filtration system the includes a flushing feature that periodically flushes the input of the R/O membrane with permeate to cleanse the membrane. The flushing feature is implemented using a flushing system control circuit that selectively places a flushing accumulator that stores permeate in communication with the input of the R/O membrane. The flushing system control circuit and accumulator are housed within a replaceable cartridge that also contains the R/O membrane.

DISCLOSURE OF THE INVENTION

Control components for flushing a R/O membrane and/or pressurizing a storage tank are located in an integrated control assembly to facilitate manufacturing and service of reverse osmosis filtration systems.

A reverse osmosis system includes a control housing that defines an inlet for feed water for water to be treated and an output from which permeate is discharged. A reverse osmosis membrane cartridge that is removable from said housing receives feed water from the housing and provides permeate to the housing. According to one embodiment, the housing includes a membrane flushing system that includes a permeate accumulator having separate feed water and permeate storage chambers separated by an pressure communicating member such that the chambers pressure in one chamber acts upon the other chamber and a flush pilot valve assembly. The flush pilot valve assembly initiates a flush cycle in response to permeate pressure. During the flush cycle the flush pilot valve assembly disconnects feed water from the cartridge and supply permeate from the accumulator to the cartridge to flush the membrane.

The system may also include a flush servo valve assembly that is actuated by the flush pilot valve assembly during a flush cycle to supply feed water to the feed water storage chamber of the permeate accumulator to force the permeate out of the permeate accumulator. At the end of a flush cycle, the pilot valve assembly routes permeate from the cartridge to the permeate storage chamber of the accumulator and the flush servo valve assembly connects the feed water storage chamber of the accumulator to a drain to refill the accumulator with permeate for a next flushing cycle.

In another embodiment, the reverse osmosis system includes a storage tank for storing permeate discharged by the reverse osmosis membrane cartridge. The storage tank includes a tank housing, an elastomeric bladder contained within the housing in which permeate from the reverse osmosis membrane cartridge is stored. An exterior surface of the bladder and an interior surface of the tank housing define a pressurizing region. In this embodiment, the housing defines an outlet for feed water and an inlet for permeate and contains a control valve assembly responsive to the opening of a dispensing device to place the pressurizing region in communication with feed water to force the permeate from the bladder to the dispensing device when the dispensing device is open.

The control valve assembly may include a tank pilot valve that, when the dispensing device is closed, moves a tank servo valve to a position that places the pressurization region in communication with a drain to allow the bladder to be filled with permeate from the reverse osmosis membrane cartridge.

DETAILED DESCRIPTION

Figure 1:
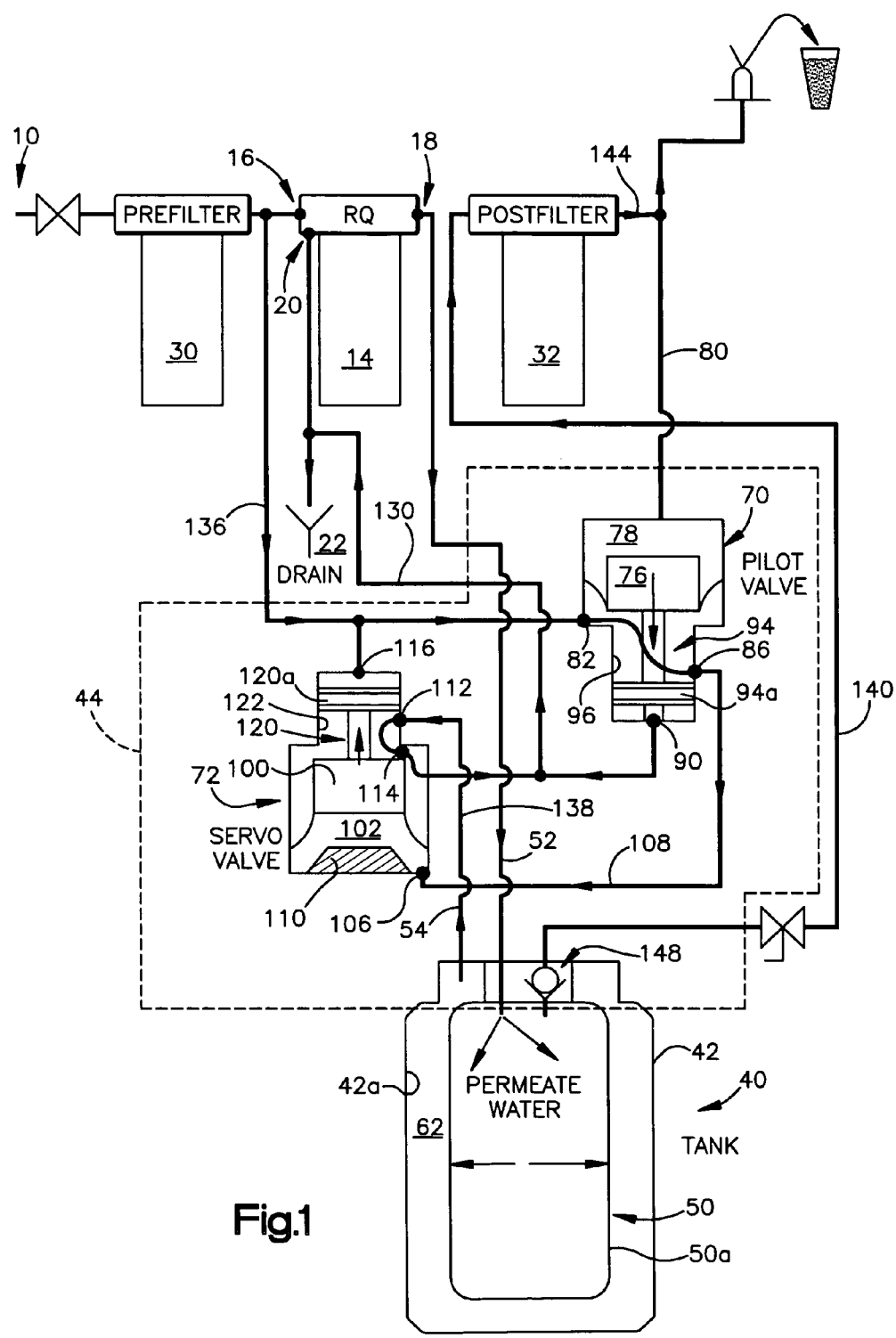
FIG. 1 is a schematic representation of a reverse osmosis system constructed in accordance with an embodiment of the invention, shown in a state in which it is delivering treated water or permeate.
Figure 2:
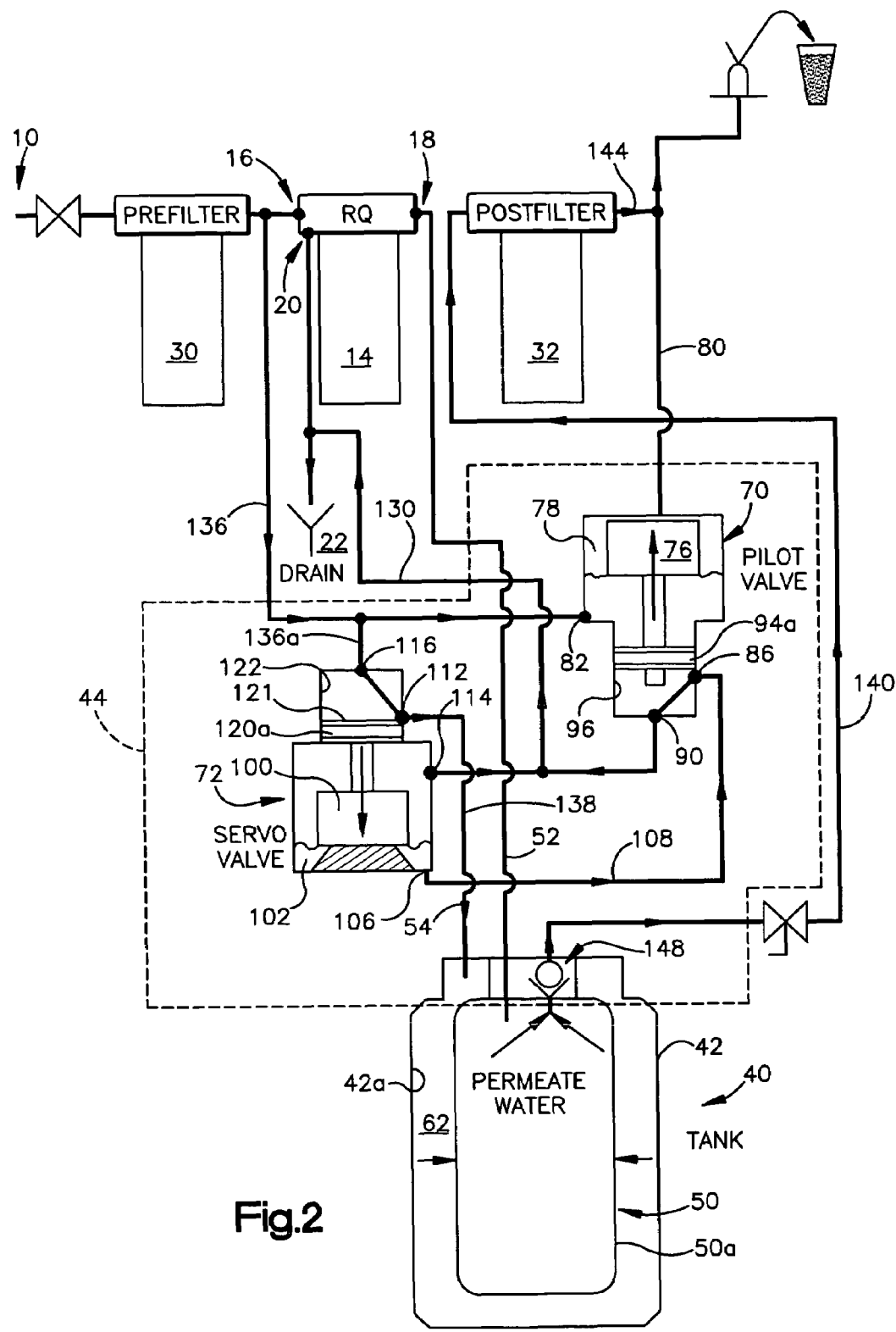
FIG. 2 is another schematic representation of the reverse osmosis system shown in a state in which it is not delivering permeate.
Figure 3:
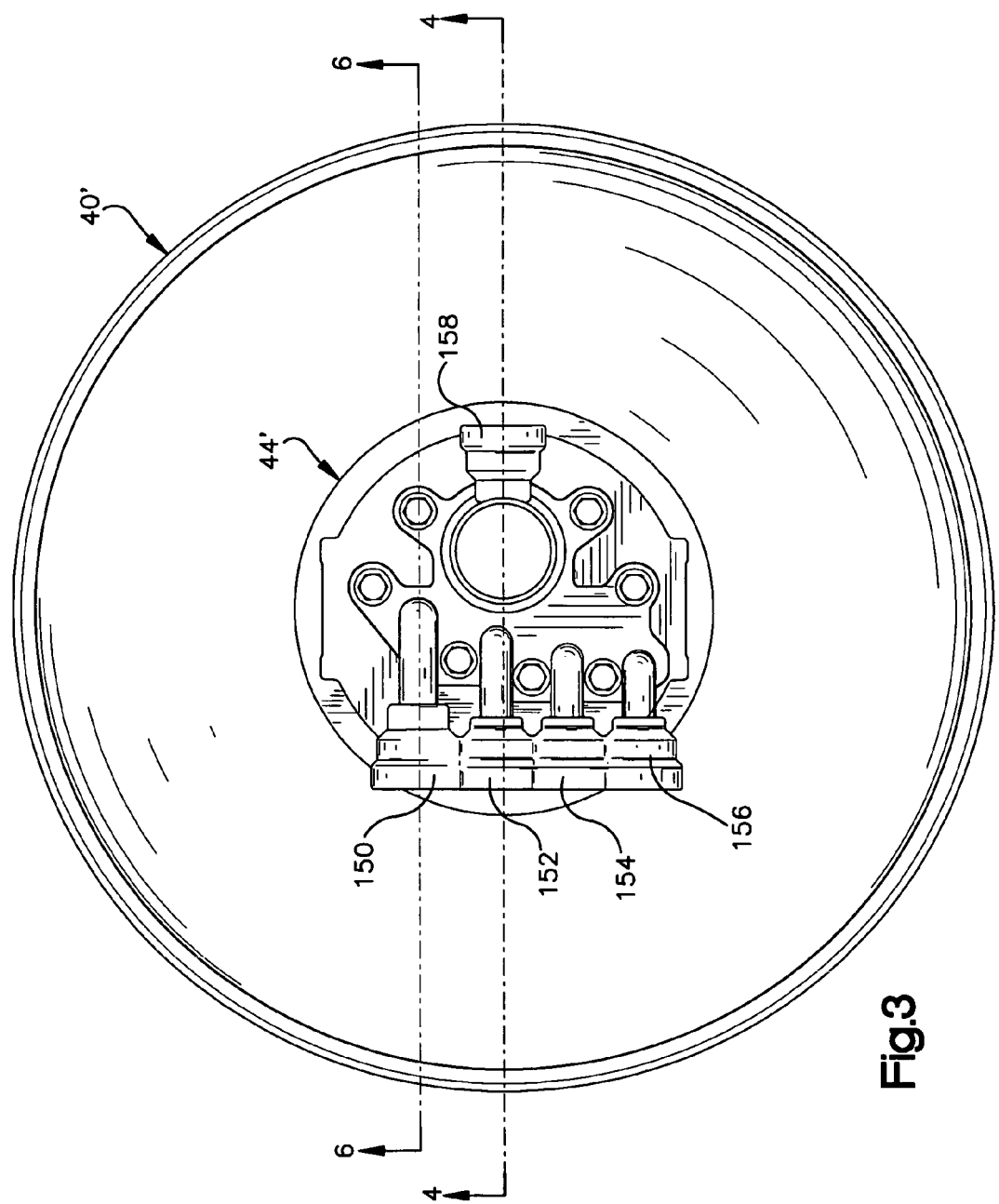
FIG. 3 is a top plan view of a control valve and associated storage tank assembly constructed in accordance with an embodiment of the invention.

FIGS. 1 and 2 schematically illustrate a reverse osmosis system for producing potable water and that embodies the present invention. FIG. 1 schematically illustrates the operation of the system when processed water is not being delivered, i.e., a tap or faucet is closed; whereas FIG. 2 illustrates the operation of the system when processed water is being delivered to a tap or faucet.

The system is connected to a source of water to be processed, indicated generally by the reference character 10. In the illustrated embodiment, the processed water is delivered to a faucet indicated generally by the reference character 12. The illustrated system includes a conventional reverse osmosis (RO) unit 14. Those skilled in the art will recognize that the RO unit 14 houses a reverse osmosis membrane (not shown) and includes an inlet port indicated generally by the reference character 16, through which the unit 14 receives water to be processed from the source 10. The unit 14 also includes a "permeate" outlet port indicated generally by the reference character 18 and a "concentrate" output indicated generally by the reference character 20 which communicates with a drain 22. The RO unit 14 may operate in a conventional manner. As is known, water to be processed is communicated to the inlet port 16 and is delivered to an internal chamber (not shown) containing the reverse osmosis membrane. Relatively pure water termed "permeate" is allowed to pass or permeate through the membrane and is discharged from the unit 14 by way of the permeate outlet port 18. Contaminants and other material remain on the input or concentrate side of the membrane and are ultimately discharged through the concentrate output 20 and dumped to the drain 22. A thorough explanation of the operation of an RO unit that may be utilized with the present invention can be found in U.S. Pat. Nos. 4,629,568 and 4,650,586, which are owned by the assignee of the present application and are hereby incorporated by reference.

The illustrated system also includes a prefilter 30 which filters large particle contaminants out of the source water to inhibit plugging of the reverse osmosis unit and a post filter 32 for performing a final filtering or "polishing" of the treated water before delivery to the faucet 12. The post filter 32 may be in the form of a carbon filter to further improve the quality and taste of the processed water. The prefilter 30 and post filter 32 are considered conventional and do not form part of the present invention.

Permeate produced by the RO unit 14 is delivered to the faucet 12 from a storage tank 40 under the control of a control valve assembly indicated by the phantom line 44. As will be explained, the tank 40 and control valve 44 may form a single, integrated assembly.

The tank 40 includes a relatively rigid outer housing 42 and an internal elastomeric bladder 50. The bladder 50 is the component which actually stores permeate and expands to accommodate permeate delivered to the bladder via passage 52. As permeate is delivered to the bladder 50, the bladder expands until it fully conforms to an inside surface 42a of the tank at which time the tank is considered full or at capacity.

Permeate in the bladder 50 is delivered to the faucet 12 by pressurizing an outside surface 50a of the bladder 50 with water at source pressure via passage or line 54. To facilitate the explanation, the region between the outside surface 50a of the bladder 50 and the inside surface 42a of the tank shell 42 will be referred to as a region 62. The pressurization and depressurization of the region 62 is controlled by the control valve assembly 44.

As seen schematically in FIGS. 1 and 2, the control valve assembly 44 includes a pilot valve 70 and a servo valve 72. As will be explained, the pilot valve 70 responds to the opening and closing of the faucet 12. The servo valve 72 controls the pressurization and depressurization of the region 62 and, in particular, controls the communication of the source water to the region 62 and the venting of the region 62 to the drain 22. The position or state of the servo valve 72 is controlled by the pilot valve 70.

The pilot valve 70 includes a diaphragm/piston 76 and a isolated piston chamber 78. When the piston chamber 78 is pressurized the piston 76 is driven downwardly to the position shown in FIG. 1. As will be explained, the piston chamber is pressurized via a signal passage 80 which pressurizes when the faucet is closed. Referring also to FIG. 2, the pilot valve 70 includes a source water port 82, a common port 86 and a drain port 90. A spool-like element 94 defining a single land 94a is connected to the piston 76 controls the communication between the source port 82 and the drain port 90 with the common port 86. The spool member 94 reciprocates within a spool chamber 96. As seen in FIG. 1, when the faucet 12 is closed, the source water port 82 is communicated with the common port 86.

The servo valve 72 is similar in operation to the pilot valve 70. However, the servo valve is constructed such that it can sustain much higher flow rates through its ports. The servo valve 72 includes a diaphragm supported piston 100 and an isolated, piston actuation chamber 102. The servo valve 72 includes a piston chamber port 106 which is connected via signal line or passage 108 to the common port 86 of the pilot valve 70. When the piston chamber 102 is pressurized, the piston 100 is driven upwardly (as viewed in FIG. 1) to the upper position shown in FIG. 1. In the absence of fluid pressure in the piston chamber 102, the piston 100 moves downwardly to the position shown in FIG. 2 at which point it abuts a stop 110.

The servo valve 72 includes a common port 112, a drain port 114 and a source water port 116. The fluid communication between these ports is controlled by a spool element 120 having a single land 120a. The spool element is connected to and is preferably integrally formed with the piston 100. The land 120a reciprocated within a spool chamber 122. the ports 112, 114 and 116 communicate with the spool chamber 122.

Referring first to FIG. 1, when the servo valve piston 100 (and hence the land 120a) is moved to its upper position as viewed in FIG. 1, the common port 112 is communicated with the drain port 114 via the spool chamber 122. In this position, water in the region 62 of the tank 40 is allowed to proceed to the drain 22 via tank line 54, which communicates with spool chamber 122 via the common port 112. The source water then flows out of the spool chamber 122 through the drain port 114 and is communicated to the drain 22 via a common drain line 130. Thus, as the bladder 50 expands to receive permeate being produced by the RO unit 14 during water production, any source water is driven out of region 62 and is discharged to the drain 22. This allows the bladder 50 to expand completely to conform to the inside surface 42a of the tank shell 42.

The piston 100 of the servo valve 72 is driven to the upper position as viewed in FIG. 1 by a signal pressure received from the pilot valve 70. In particular, when the faucet is closed the pilot valve chamber 78 is pressurized driving the piston 76 downwardly to the position shown in FIG. 1. In this position, source water is communicated to the spool chamber 96 via the source water port 82. The water in the spool chamber 96 is delivered to the servo valve piston chamber 102 via the common port 86 of the pilot valve 70 and the signal line 108. As explained above, in this state, source water in the region 62 is vented to the drain 22 and the permeate in the bladder 50 is at substantially zero pressure. It should be noted that the bladder 50 does exert some minimal pressure on the permeate due to its resistance to expansion.

The inside of the bladder 50 is communicated with the output port 18 of the RO unit 14 via the supply line 52. Since the pressure in the bladder 50 is substantially zero, the RO unit 14 begins producing permeate and delivering that permeate to the bladder 50 via the supply line 52. As the bladder 50 expands, source water in the region 62 is discharged to the drain 22 via the circuit explained above.

Referring now to FIG. 2, the operation of the system when permeate is being dispensed from the faucet 12 is as follows. When the faucet 12 is opened, pressure in the signal line 80 drops to substantially zero. The absence of pressure in the pilot chamber 78 allows the source water pressure communicated to the spool chamber 96 via source water line 136 and source port 82 to drive the piston 76 to its upper position shown in FIG. 2. In this position, the pilot valve common port 86 is communicated with the drain port 90. As a consequence, fluid in the servo valve piston chamber 102 is allowed to proceed to the common drain line 130 and, hence, the drain 22 via signal line 108 and the spool chamber 96 of the pilot valve 70. As seen in FIG. 2, when the land 94a is in its upper position as viewed in FIG. 2, the spool chamber 96 cross communicates the common port 86 and the drain port 90.

The communication of the servo valve piston chamber 102 with the drain 22 causes the servo valve piston 100 to move downwardly (as viewed in FIG. 2) due to the application of source water pressure to an upper surface 121 (as viewed in FIG. 2) of the land 120a of spool 120 via the source water line 136, branch line 136a and port 116. When the piston moves to its lower position (as viewed in FIG. 2) the source water port 116 of the servo valve 72 is communicated with its common port 112. This allows source water pressure to flow into the tank region 62 via the source water line 138. The application of source water pressure to the region 62 produces a contraction force on the permeate bladder 50 driving permeate from the bladder to the open faucet 12 via the permeate supply line 140 which communicates with the post filter 32. The post filter 32 in turn communicates with the faucet 12 via branch line 144. It should be noted here that the supply line includes a check valve 148 which prevents reverse flow of the permeate in the line into the tank 40 and maintains pressurization of the line 140 when the faucet 12 is closed.

It should also be noted here that both the pilot valve 70 and servo valve 72 are operated by differential pressures applied to their associated pistons. Turning first to the pilot valve 70, the effective pressure area of the piston chamber side of the piston/diaphragm is equal to the cross-sectional area of the piston chamber 78. The effective pressure area of the underside of the diaphragm/piston (which is exposed to the fluid pressure in the spool chamber 96) is equal to the cross-sectional area of the piston chamber 96 minus the cross-sectional area of the control element or spool member 94. Thus, if source water pressure is applied to the spool chamber 96 of the pilot valve 70 via the source port 82 concurrently with the application of permeate pressure as exerted by source water pressure in the region 62, a net upwardly directed force is applied to the piston/diaphragm 76 (as viewed in FIG. 2), which causes the piston to move upwardly.

The same relationship exists for the servo valve piston/diaphragm so that when source water pressure is applied to the servo valve piston chamber 102, concurrently with source water pressure applied to the end surface 121 of the control spool/land 120a via the source water port 116 of the servo valve 72, a net upwardly directed force is applied to the piston/diaphragm 100 causing the piston to move to its upper position shown in FIG. 1.

With the present system, the overall delivery rate and permeate production are substantially improved. During permeate production, i.e., when the faucet 12 is closed, the permeate reservoir (as provided by the bladder 50) is at substantially zero pressure and, hence, the RO unit 14 sees very little resistance to flow thus maximizing flow through the RO unit 14. During delivery of permeate through the faucet 12, substantially full supply pressure is applied to the bladder 50 and, hence, permeate is delivered to the faucet 12 at substantially source pressure minus pressure losses due to flow restrictions due to lines and passages. As a consequence, the flow rate of permeate from the faucet 12 is substantially constant since at all times supply pressure is applied to the exterior surface of the bladder 50 as compared to bladder tanks that utilize a precharge which results in reduced pressure as permeate in the tank is depleted.

Turning now to FIG. 3-7, a control valve and tank assembly constructed in accordance with the preferred embodiment of the invention is illustrated. For purposes of reference, the apparatus shown in FIGS. 3-7 generally corresponds to the items referenced as 44 and 40 in FIGS. 1 and 2. To facilitate the explanation, like components in the apparatus shown in FIGS. 3-7 will be given the same reference characters used in FIGS. 1 and 2 followed by an apostrophe.

Accordingly, the control valve/storage tank assembly includes a control valve 44' which is threadedly received by a tank 40'. As previously described, the tank 40' includes a relatively rigid tank shell 42' having an inside surface 42a'. In the illustrated embodiment the tank is made from two tank halves that are joined by a spin welding process. Details of this type of tank construction can be found in U.S. Pat. No. 4,579,242 that is owned by the present assignee and is hereby incorporated by reference. The bladder 50' is disposed within the tank shell 42' and expands to receive permeate and contract to expel permeate. The region 62' located between the outside of a bladder 50' and the inside 42*a'* of the tank 42' receives source water in order to apply contracting forces on the bladder to expel permeate, whenever the faucet 12 (shown in FIGS. 1 and 2) is opened.

Figure 5:
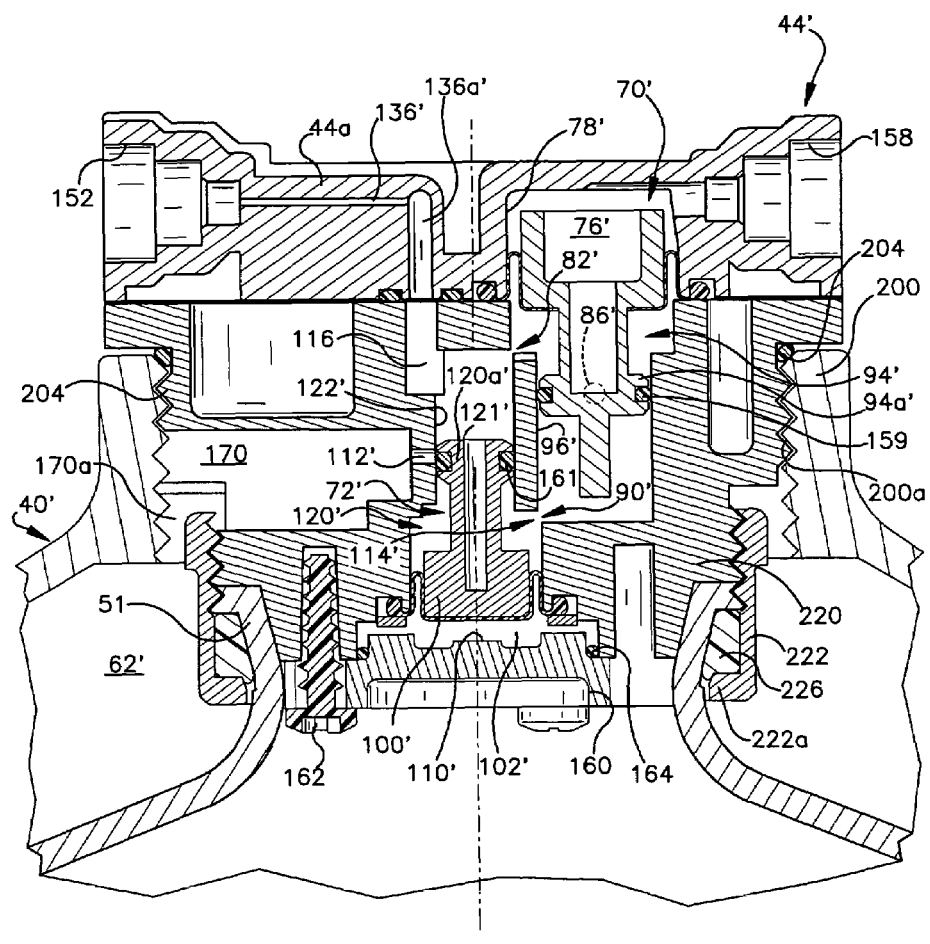
FIG. 5 is an enlarged fragmentary view of a portion of the control valve and tank assembly as indicated by the detail line 5-5 in FIG. 4.
Figure 6:
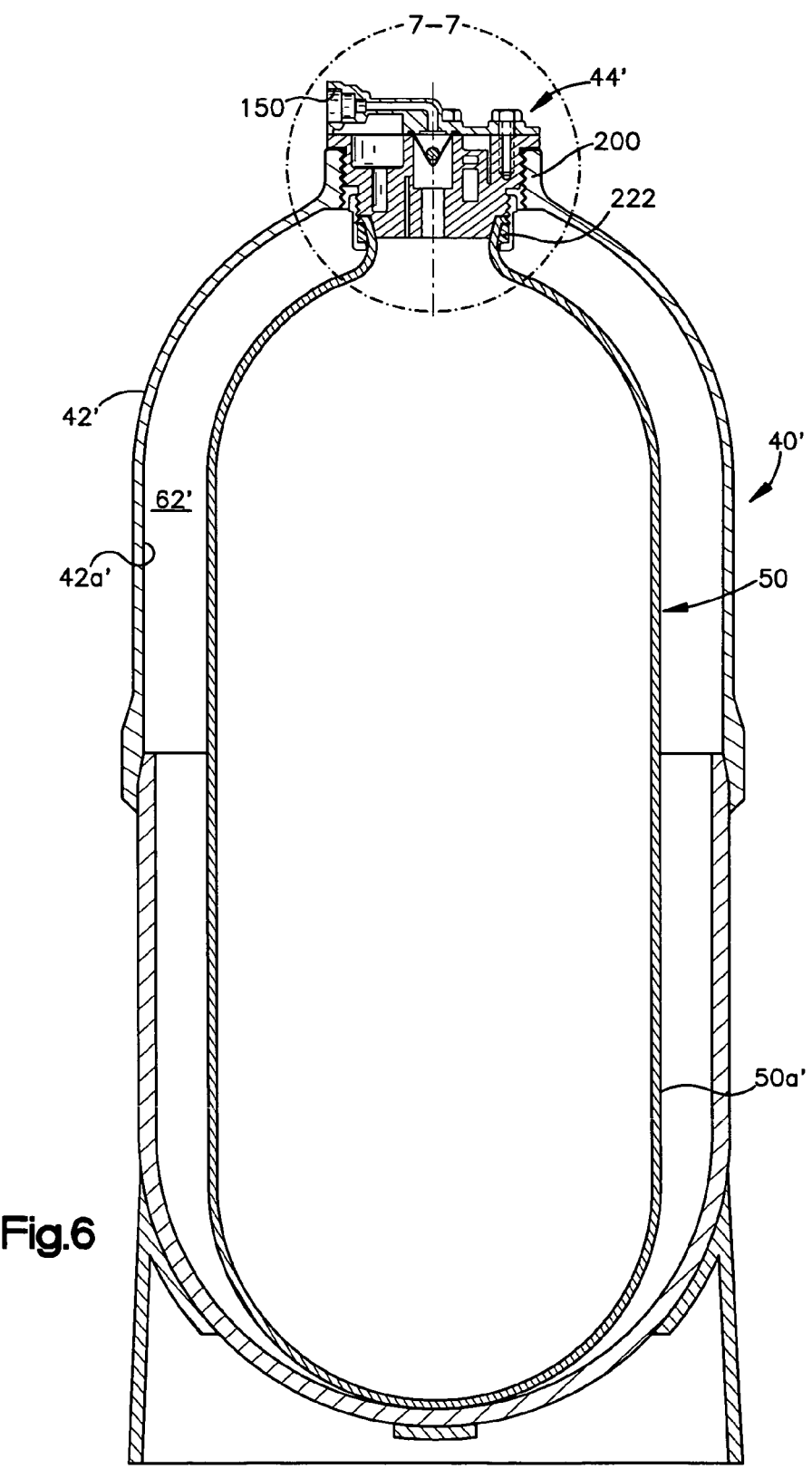
FIG. 6 is a sectional view of the control valve and tank assembly as seen from a plane indicated by the line 6-6 in FIG. 3.

Referring now to FIG. 5, the components that comprise the control valve 44' (represented schematically in FIGS. 1 and 2) are shown in an actual control valve construction. The valve housing 44*a* which may be in assemblage of individual housing elements, defines a plurality of ports (shown best in FIG. 3). In particular, the housing defines a tank outlet port 150, a source water feed port 152, a permeate or product port 154, a drain port 156 and a signal port 158. Referring to FIGS. 1 and 2, in an actual system the above-identified ports would be connected as follows. The tank port 150 would connect to the conduit 140. The feed port 152 would connect to the conduit 136. The permeate port 154 would connect to the permeate supply port 18 of the RO unit 14 via conduit 52. The signal port 158 would be connected to the conduit 80.

The housing 44*a* at least partially defines the pilot valve 70'. Referring, in particular to FIG. 5, the housing 44*a* reciprocally mounts the diaphragm carried pilot piston 76' in the piston chamber 78' at least partially defined by the valve 44*a*. The piston chamber 78' communicates with the signal port 158. As explained above the port 158 is connected to the signal line 80 (shown in FIGS. 1 and 2) which in turn, communicates with the faucet feed line 144 (shown schematically in FIG. 1). In the actual embodiment, flexible conduit is used to connect the port 158 with the faucet supply line and/or the output port of the post filter 32 using a suitable fitting.

The piston 76' is connected to a spool 94' including a land 94*a'*; the land 94*a'* sealingly engages the inside of the spool chamber 96'. An O-ring 159 effects a seal between the land 94*a'* and the spool chamber 96' while permitting reciprocating movement in the land 94*a'*. As described in connection with FIGS. 1 and 2, the land 94*a* controls the communication of a common port 86' (shown in phantom) with either the source water port 82' or the drain port 90'. In the actual valve construction, the ports 82' and 90' may be formed by wall openings defined in the body of the valve, rather than precisely defined ports. This is the construction shown in FIG. 5.

The servo valve 72' (the position of which is controlled by the pilot valve 70) is located immediately adjacent the pilot valve 70'. It includes a diaphragm supported piston 100' that at least partially defines a piston chamber 102'. A stop 110' determines the lowermost position of the piston 100'. As explained above, the piston is connected to a spool 120' which carries a land 120*a'* that is slidably movable within a spool chamber 122'. An O-ring 161 is mounted to the land 120*a'* and sealingly engages the inside of the spool chamber 122'. The spool 120*a'* controls the communication of the common port 112' with the a drain port 114' and the source water port 116'. As explained above, the ports themselves may be defined by openings formed in the valve body/housing, rather than precisely defined ports.

As seen in FIG. 5, the piston chamber 102' is at least partly formed by a bottom cap 160 that is secured to the rest of the valve body by a plurality of threaded fasteners 162 (only one is shown). The interface between the cap and the rest of the valve body is sealed by an O-ring 164.

As seen best in FIG. 5, source water from the source water port 152 is delivered to the spool chamber 122' by the passage 136' which is connected to the spool chamber by a branch passage 136*a'*. When the servo piston 100' is moved to its lowest position as viewed in FIG. 2, source water is communicated from the port 116' to the common port 112' (via the spool chamber 122'). The common port 112' delivers the source water to a cavity 170 formed in the control valve that communicates with the region 62' via passage 170*a*.

When the piston 100' moves to its upper position, the common port 112' communicates with the drain port 114' which, as seen in FIG. 5, communicates directly with the drain port 90' of the pilot valve 70'. A passage (not shown) communicates these drain ports with the drain 22 (see FIG. 1) via the control valve drain port 156 which is connected to an actual drain via a suitable conduit.

When the servo valve piston 100' is in its upper position (shown in FIG. 1), the region 62' is communicated with the drain 22 (FIG. 1) and, hence, permeate produced by the RO unit 14 (shown in FIG. 1) enters the bladder 50' gradually expanding the bladder. The actual passage 52 that is shown schematically in FIG. 1, is suitably molded within the valve housing.

When permeate is being delivered to the faucet 12 (shown in FIG. 1) the region 62' is pressurized upon movement of the servo valve piston 100' to its lower position at which point the common port 112' communicates with the source water port 116'. In this position of the piston 100' source water under source pressure to is delivered to the region 62' tending to contract the bladder 50' thus, driving permeate from the bladder.

Figure 7:
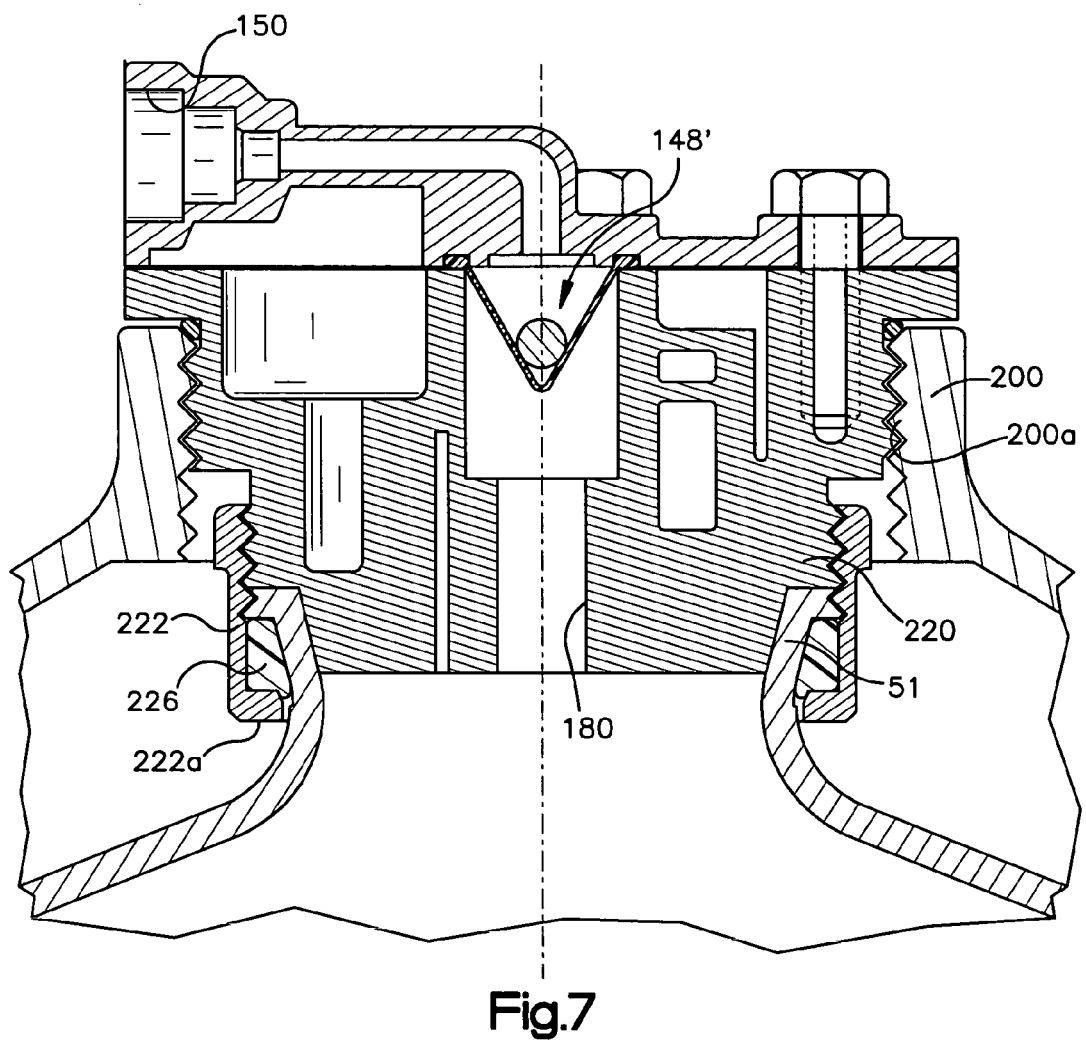
FIG. 7 is an enlarged, fragmentary view of a portion of the control valve and tank assembly as indicated by the detail line 7-7 in FIG. 6.

As seen best in FIG. 7, permeate is delivered through a passage 180 formed in the body of the control valve which communicates with a check valve 148'. The check valve 148' in turn communicates with the discharge or tank port 150 formed in the valve housing. The discharge/tank port 150 is connected to the post filter 32 by a conduit (not shown) represented by the line 52 in FIGS. 1 and 2.

Figure 4:
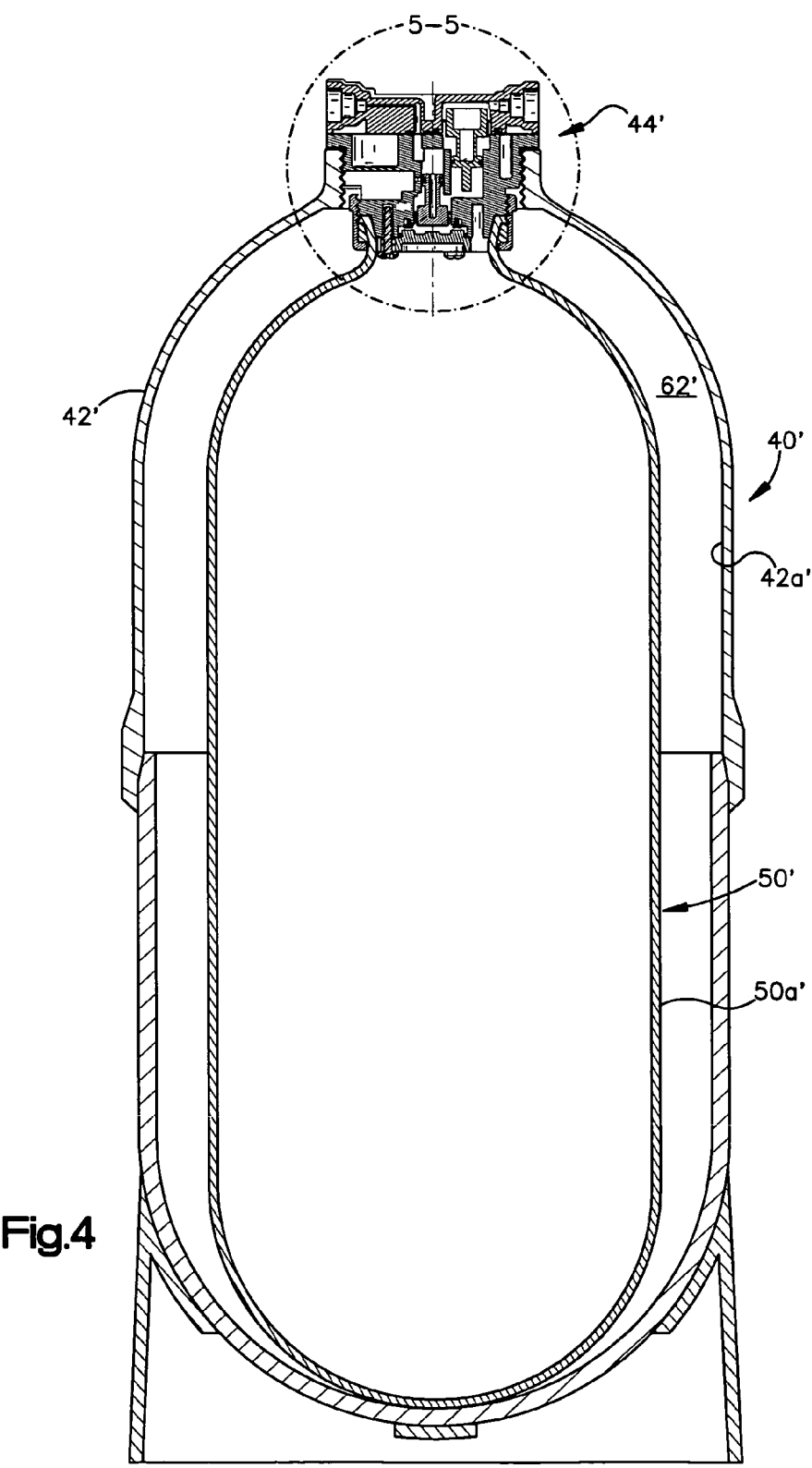
FIG. 4 is a sectional view of the control valve and storage tank assembly as seen from the plan indicated by the line 4-4 in FIG. 3.

Referring to both FIGS. 4 and 5, the control valve 44' is threadedly mounted to the top of the tank 40'. In particular, the tank 40' includes a neck 200 having an internal thread 200*a*. A complementary thread 204 is formed on the outside of the valve body and is threadedly engageable with the neck 200 of the tank 40'. An O-ring 208 seals the interface between the tank 40' and the control valve 44', but allows the control valve 44' to be removed from the tank 40' for replacement and/or service.

As seen best in FIG. 5, the bottom portion of the control valve 44' includes a depending, threaded portion indicated generally by the reference character 220. The threaded portion provides a releasable securement for the bladder 50'. In particular, a threaded collar or retaining nut 222, is threadedly received by the lower portion 220 of the control valve 44'. The retainer 222 includes an inwardly directed flange portion 222*a*, which supports a bladder retaining bearing 226; the bearing 226 facilitates rotation of the retaining nut 222 and simplifies installation of the bladder 50'. The bladder 50' includes a neck portion 51 that is captured between the bladder retaining bearing 226 and a tapered or cone-shaped segment 228 defined on the lower portion 220 of the control valve 44'. When the collar 222 is threaded onto the control valve portion 220, the bearing 226 is urged into sealing contact with the neck 51 of the bladder 50' and secures the bladder to the cone-shaped portion 228 of the control valve 44'.

With the disclosed storage system, permeate is delivered at a substantially constant pressure to the tap and, as a result, maximum flow rates to the tap are maintained regardless of the amount of permeate in the tank. In addition, because the pressurizing region 62 is substantially zero when permeate is being produced by the reverse osmosis system, the production rate of the RO unit is maximized since it does not see increased resistance as the storage tank fills, as is the case with precharged storage tanks.

Figure 8:
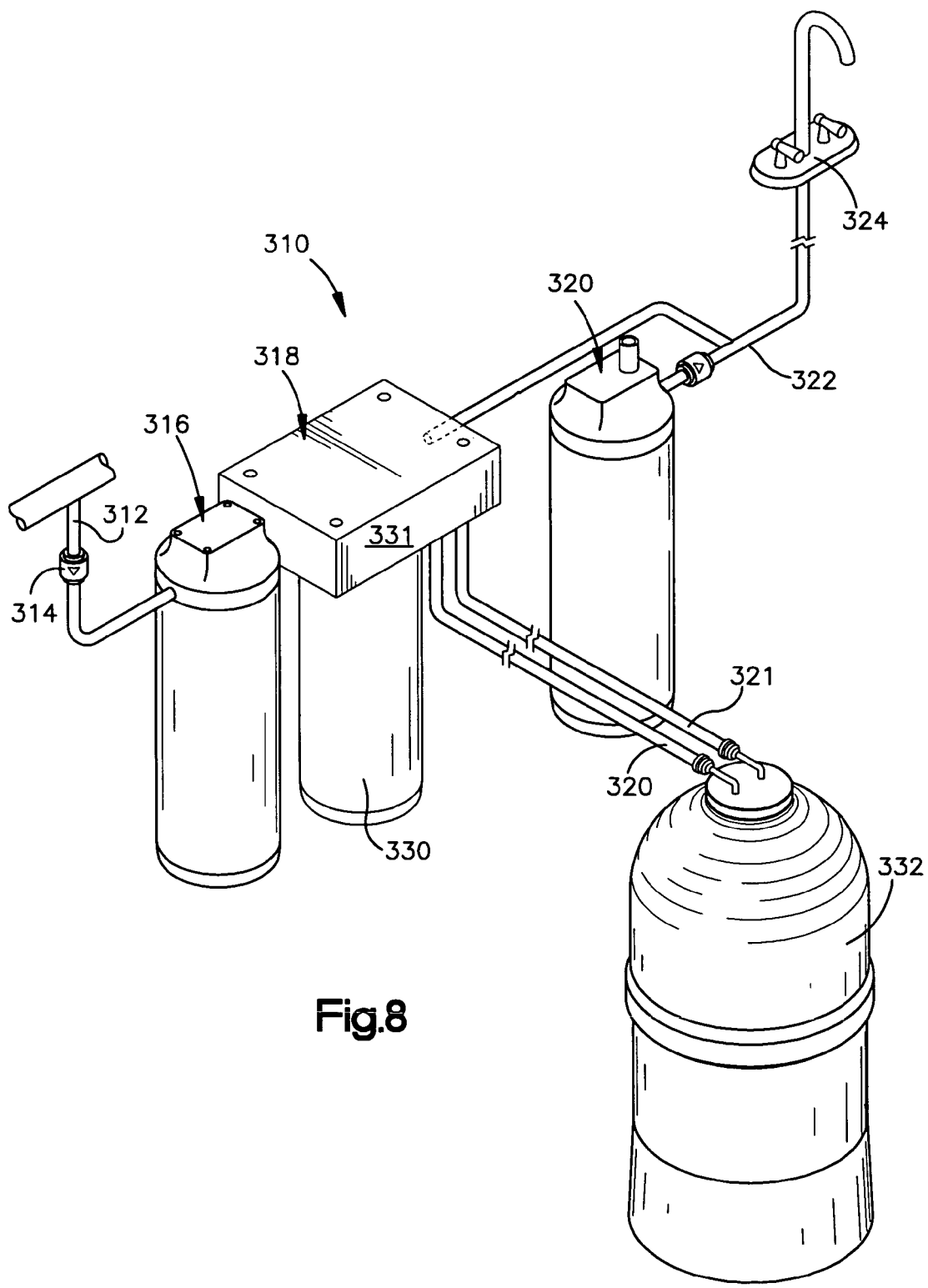
FIG. 8 is a perspective view of a water filtration system constructed in accordance with an alternative embodiment of the invention.
Figure 9:
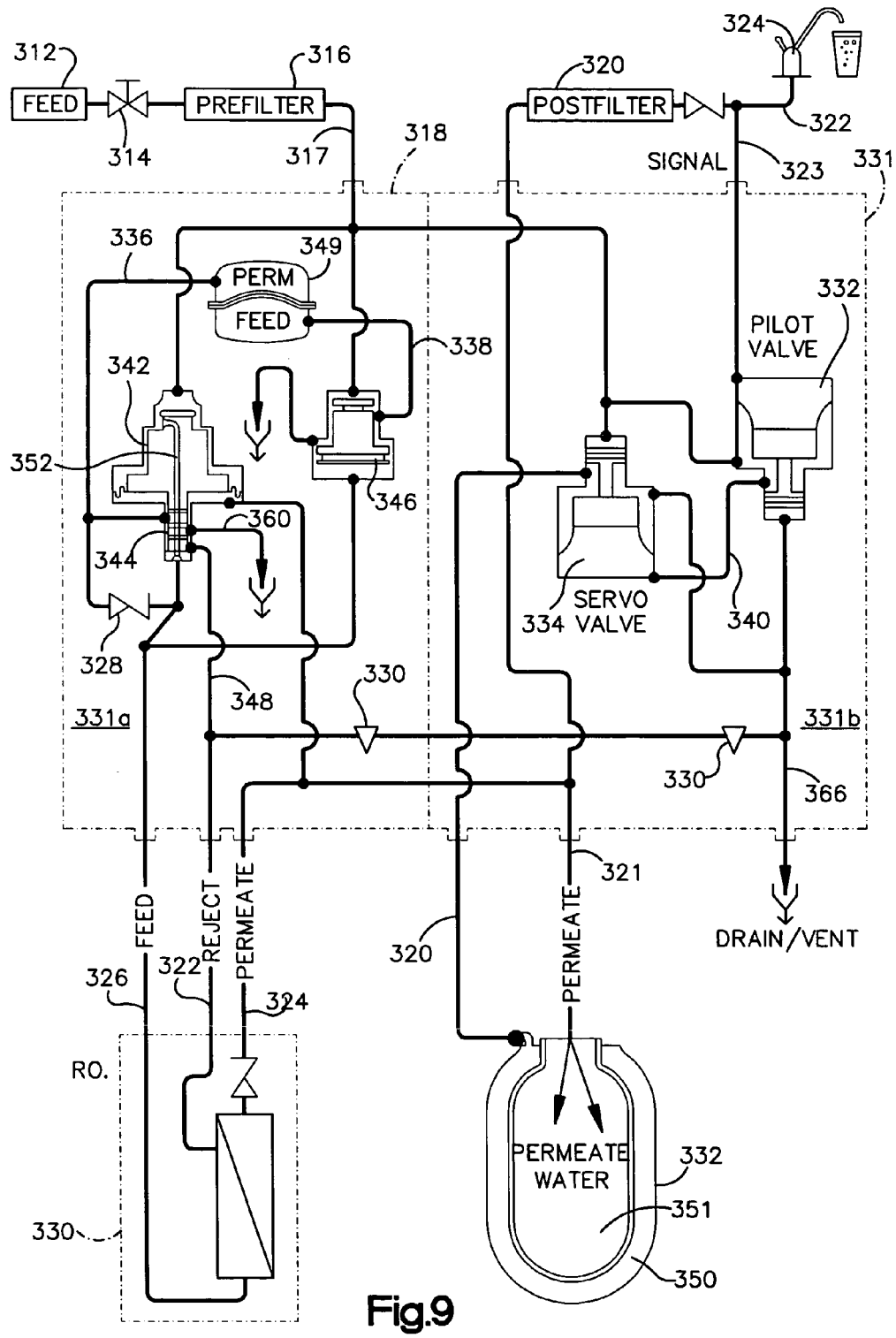
FIG. 9 is a schematic flow diagram of the water filtration system of FIG. 8.

FIGS. 8 and 9 illustrate an alternative embodiment for carrying out the present invention. The alternative embodiment integrates control of feed and permeate to and from the storage tank into a control assembly 331 that also houses control components and an accumulator associated with an R/O membrane flushing feature. The control assembly replaces the separate control valve assembly 44 depicted in FIGS. 1-7 as well as flushing feature components that were housed in a replaceable R/O filter cartridge described in U.S. Pat. No. 4,650,586. This embodiment simplifies construction of the storage tank, reduces the cost of R/O filtration cartridges, and eliminates the need for redundant components in the prior described embodiments.

FIG. 8 shows a water filtration system 310 constructed according to the alternative embodiment. The filtration system 310 has feed source 312 which includes an inline valve 314 for selectively controlling the amount of feed liquid permitted to flow to the filtration system 310. The filtration system includes a reverse osmosis filter 318, and, optionally, a prefilter 316 and a post filter 320. In the described embodiment, feed liquid coming from the feed source 312 enters the filtration system 310 via the prefilter 316 which, as discussed above, filters the feed liquid prior to continuing through the filtration system 310.

The feed liquid exits the prefilter 316 and is communicated to a R/O filtration unit 318 that removes impurities from the feed liquid via a reverse osmosis (R/O) process. The R/O filtration unit 318 includes a control assembly 331 having connected thereto a R/O filter cartridge 330. In addition to housing components associated with an R/O filter flushing feature, the control assembly 331 includes components that control the flow of feed water in pressurization line 320 to a water storage tank 332 as well as the flow of permeate in line 321 to and from the storage tank 332. As discussed above, the feed water pressurizes an internal bladder in the storage tank 332 that holds permeate from line 321 to provide increased and consistent flow of permeate to the faucet 324. The permeate liquid is then communicated to a post filter 320. The post filter 320 may be in the form of a carbon filter to further improve the quality and taste of the processed water. An output 322 discharges feed liquid in most instances to a faucet 324.

The construction and functionality of the prefilter 316, post filter 320, R/O filter cartridge 330, and the storage tank 332 in the presently described alternative embodiment are substantially identical to that discussed with respect to the above described embodiment and U.S. Pat. No. 4,650,586. As such, only the control assembly 331 will be discussed with respect to the presently described embodiment. The control assembly described herein includes control components for both an R/O filter flush system and for a feed water pressurized storage tank, however, it is contemplated that the control assembly could house control components for either the R/O flush system or the storage tank according to the present invention. For example, the R/O flush system control could be located in the control assembly 331 and a standard air pressurized tank (which does not require a control circuit) could be used to store permeate.

Turning now to FIG. 9, a schematic of the filtration system 310 is illustrated. In particular, the control assembly 331 is shown in detail. The control assembly 331 as shown in FIG. 9 is divided by a dashed line to delineate the general functional components associated with the conventional R/O filtration and flush control as 331a. The functional components associated with the flow control are designated 331b. The flow control components are housed in the control assembly 331 in the embodiment depicted in FIGS. 8 and 9. It can be recalled that in the first described embodiment, the flow control components in 331b were located in the control valve assembly 44 on the storage tank as shown in FIGS. 1-7. In prior R/O filtration systems, such as that described in the '586 patent, the control and flush components were housed in the removable cartridge 330 as opposed to the control assembly 331.

The R/O filter and flush control components shown in 331a are described in detail in U.S. Pat. No. 4,650,586 and only an overview of the functioning of these components is provided here. The control valves and accumulator that were located in the R/O filter cartridge in the system described in the '586 have been moved to the control assembly 331a. The R/O control assembly 331a receives feed water from the prefilter through an input conduit 317. The feed water is directed to a flush servo valve assembly 346 and a R/O pilot valve assembly 342. The R/O pilot valve assembly 342 receives a signal pressure from the permeate line 324. When permeate pressure is sufficient to overcome the biasing force of an internal spring, the R/O pilot valve assembly 342 moves to a flush position (opposite that shown) that initiates a flush cycle.

In the flush position the R/O pilot valve assembly 342 cuts off feed water flow into R/O pilot valve assembly 342 and through internal conduit 352 to line 326 which feeds the R/O filter cartridge 330 and the flush servo valve 346. This cut off of feed water flow causes the pressure on line 326 to drop and in response to this drop in pressure, the flush servo valve moves to a position that forces feed water from line 317 to move through line 338 to flood the flush accumulator 349 with feed water to push permeate out of the accumulator. The permeate flows through line 336, check valve 328, and into feed line 326 to flush the membrane with the flushing water exiting the cartridge 330 on line 322/348 through the R/O pilot valve assembly 342 to drain.

Once the permeate water in the accumulator is exhausted, the system is at rest until permeate is drawn from the tank. At this point, permeate pressure on line 324 falls, causing the R/O pilot valve assembly 342 to move down and allow flow of feed water through the valve assembly, down line 326 into the filter cartridge 330. In this position, the R/O pilot valve assembly 342 connects the permeate line 324 to the accumulator permeate line 336 to fill the accumulator for the next flush cycle. The flow of feed water is also returned to the flush servo valve 346 which moves the flush servo valve assembly up, providing a connection from the feed water side of the accumulator 349 to drain so that the feed water in the accumulator can be displaced by the permeate. Once the permeate side of the accumulator 349 is filled and the permeate tank 351 is at sufficient pressure, the system returns to the initial state.

Flow control components shown in 331b are described in greater detail above. The following is a summary of the functioning of these components which are now housed in control assembly 331 rather than on the storage tank. Feed water from the conduit 317 is routed to the servo valve 334 and the pilot valve 332. The pilot valve 70 responds to the opening and closing of a faucet 324. The position of the servo valve 334 and pilot valve 332 in FIG. 9 corresponds to their positions when the faucet is closed. The servo valve 334 controls the pressurization and depressurization of the storage tank 332 by controlling the flow of feed water through tank pressurization line 320 to the region 350 in the storage tank. The position or state of the servo valve 334 is controlled by the pilot valve 332. The position or state of the pilot valve 332 is controlled by signal line 323 that pressurizes when the faucet 324 is closed. When the faucet is closed, the pilot valve is actuated by pressure on line 323 to overcome the pressure of feed water on line 317 to move a position that directs feed water from conduit 317 to the servo valve via control line 340. When the feed water is being supplied to the servo valve in this manner, the servo valve moves to a position connects the region 350 to the drain line 366 to allow the refilling of permeate bladder region 351 via line 321 to displace water in region 350 to the drain.

When the faucet 324 is open, the pilot valve 332 is moved to an opposite position as that shown in FIG. 9. In this position, the pilot valve disconnects the flow of feed water on line 340, eliminating resistance to the pressure on line 317, causing the servo valve 334 to move down to an opposite position to that shown in FIG. 9. In this position, the servo valve connects feed water line 317 with tank pressurization line 320 to allow the feed water pressure to provide pressure to the region 350 while permeate is dispensed from the bladder 351.

For the purposes of this description, the set of valves 342, 346, 334, and 332 and their associated lines and check valves are housed in a single control assembly 331 that is located adjacent to the R/O filtration unit 330, however any control configuration that centrally locates the storage tank control or R/O filtration control components in a location separate from the storage tank and/or R/O filter cartridge is contemplated by the present invention. Simple mechanical connections can then be used to connect the pressurization line 320 and permeate flow line 321 to the pressurization region 350 and bladder 351, respectively.

Although the invention has been described with a certain degree of particularity, it should be understood that various changes can be made to those skilled in the art without departing from the spirit or scope of the invention as hereinafter claimed.

We claim:

1. A reverse osmosis system comprising:
    a system control assembly including a housing, said control assembly defining an inlet for feed water to be treated and an output from which permeate is discharged;
    a reverse osmosis membrane cartridge, external to and removably attached to said housing, said membrane cartridge adapted to receive feed water from said housing and to discharge permeate to said housing; and
    a membrane flushing system located within said housing, said flushing system including a permeate accumulator located within said housing and having separate feed water and permeate storage chambers separated by an elastomeric member such that pressurization of said feed water chamber is operative to urge permeate from said permeate chamber under predetermined conditions, and a flush pilot valve assembly that initiates a flush cycle in response to sensing a predetermined permeate pressure in a permeate storage tank, and during said flush cycle said flush pilot valve assembly operative to disconnect feed water from said cartridge and supply permeate from said accumulator to said cartridge to flush said membrane.

2. The reverse osmosis system of claim 1 wherein said membrane flushing system comprises a flush servo valve assembly that is actuated by said flush pilot valve assembly during a flush cycle to supply feed water to said feed water storage chamber of said permeate accumulator to force said permeate out of said permeate accumulator.

3. The reverse osmosis system of claim 1 wherein at the end of said flush cycle, said pilot valve assembly routes permeate from said cartridge to said permeate storage chamber of said accumulator and said flush servo valve assembly connects said feed water storage chamber of said accumulator to a drain to refill said accumulator with permeate for a next flushing cycle.

4. The reverse osmosis system of claim 1 wherein said storage tank stores permeate discharged by said reverse osmosis membrane cartridge and comprises:
    a tank housing;
    an elastomeric bladder contained within said housing in which permeate from said reverse osmosis membrane cartridge is stored; and
    wherein an exterior surface of said bladder and an interior surface of said tank housing define a pressurizing region;
    and wherein said system control assembly defines an outlet for feed water and an inlet for permeate and contains a control valve assembly responsive to the opening of a dispensing device to place said pressurizing region in communication with feed water to force said permeate from said bladder to said dispensing device when said dispensing device is open.

5. The reverse osmosis system of claim 4 wherein said control valve assembly includes a tank pilot valve that, when said dispensing device is closed, moves a tank servo valve to a position that places said pressurization region in communication with a drain to allow said bladder to be filled with permeate from said reverse osmosis membrane cartridge.

6. The reverse osmosis system of claim 1 further comprising:
    a tank housing;
    an elastomeric bladder contained within said tank housing in which permeate from said reverse osmosis membrane cartridge is stored; and
    wherein an exterior surface of said bladder and an interior surface of said tank housing define a pressurizing region;
    and wherein said system control assembly defines an outlet for feed water and an inlet for permeate and contains a control valve assembly responsive to the opening of a dispensing device to place said pressurizing region in communication with feed water to force said permeate from said bladder to said dispensing device when said dispensing device is open.

7. A reverse osmosis system comprising:
    a system control assembly including a housing, said control assembly defining an inlet for feed water to be treated and an output from which permeate is discharged;
    a reverse osmosis membrane cartridge, external to and removably attached to said housing, said membrane cartridge adapted to receive feed water from said housing and to discharge permeate to said housing; and
    a membrane flushing system located within said housing, said flushing system including a permeate accumulator located within said housing and having separate feed water and permeate storage chambers separated by an elastomeric member such that pressurization of said feed water chamber is operative to urge permeate from said permeate chamber under predetermined conditions, and a flush pilot valve assembly that initiates a flush cycle in response to sensing a predetermined permeate pressure in a permeate storage tank, and during said flush cycle said flush pilot valve assembly operative to disconnect feed water from said cartridge and communicate feed water to said feed water chamber of said permeate accumulator whereby permeate from said accumulator is supplied to said cartridge to flush said membrane;

a tank housing in which permeate from said reverse osmosis membrane cartridge is stored;

an elastomeric bladder contained within said tank housing a pressurizing region defined at least in part by said elastomeric bladder;

and wherein said system control assembly defines an outlet for feed water and an inlet for permeate and contains a control valve assembly responsive to the opening of a dispensing device to place said pressurizing region in communication with feed water to force said permeate from said tank housing to said dispensing device when said dispensing device is open.

8. The reverse osmosis system of claim 1 wherein said storage tank stores permeate discharged by said reverse osmosis membrane cartridge and comprises:

a tank housing in which permeate from said reverse osmosis membrane cartridge is stored;

an elastomeric bladder contained within said tank housing a pressurizing region defined at least in part by said elastomeric bladder;

and wherein said system control assembly defines an outlet for feed water and an inlet for permeate and contains a control valve assembly responsive to the opening of a dispensing device to place said pressurizing region in communication with feed water to force said permeate from said tank housing to said dispensing device when said dispensing device is open.

* * * * *